United States Patent
Casper et al.

(10) Patent No.: US 6,192,482 B1
(45) Date of Patent: Feb. 20, 2001

(54) SELF-TIMED PARALLEL DATA BUS INTERFACE TO DIRECT STORAGE DEVICES

(75) Inventors: Daniel Francis Casper, Poughkeepsie, NY (US); James Thomas Brady, San Jose, CA (US); Robert Stanley Capowski, Verbank, NY (US); Frederick John Cox, Wappingers Falls, NY (US); Frank David Ferraiolo, New Windsor, NY (US); Marten Jan Halma, Poughquag, NY (US); Benjamin Hong Wu, Cupertino, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 08/261,523

(22) Filed: Jun. 17, 1994

(51) Int. Cl.[7] ..................................................... G06F 1/04
(52) U.S. Cl. .......................................... 713/503; 710/129
(58) Field of Search ..................................... 395/275, 800, 395/200.2, 250, 841, 849, 850, 872, 880; 710/129; 714/400, 503, 600

(56) References Cited

U.S. PATENT DOCUMENTS

| | | |
|---|---|---|
| 4,050,097 | 9/1977 | Miu et al. . |
| 4,371,962 | 2/1983 | Zeitraeg . |
| 4,694,472 | 9/1987 | Torok et al. . |
| 4,771,440 | 9/1988 | Fromm et al. . |
| 4,791,639 * | 12/1988 | Afheldt et al. ........................ 370/58 |
| 4,885,739 * | 12/1989 | Read et al. .......................... 370/58.1 |
| 4,903,258 * | 2/1990 | Kuhlmann et al. ................. 370/58.2 |
| 4,914,429 | 4/1990 | Upp . |
| 5,022,057 | 6/1991 | Nishi et al. . |
| 5,051,990 | 9/1991 | Kato . |
| 5,113,395 * | 5/1992 | Murakami et al. .................. 370/102 |
| 5,113,430 * | 5/1992 | Richardson, Jr. et al. ............ 379/88 |
| 5,166,926 * | 11/1992 | Cisneros et al. ....................... 370/60 |
| 5,237,571 * | 8/1993 | Cotton et al. ..................... 370/110.1 |
| 5,251,299 * | 10/1993 | Masuda et al. ...................... 395/200 |
| 5,410,537 * | 4/1995 | Niessner ................................ 370/16 |

\* cited by examiner

Primary Examiner—John A. Follansbee
(74) Attorney, Agent, or Firm—Lynn L. Augspurger; Venable (57) ABSTRACT

An attached storage media link has a self-timed interface (STI) in which a clock signal clocks bit serial data onto a parallel, electrically conductive bus and the clock signal is transmitted on a separate line of the bus. The received data on each line of the bus is individually phase aligned with the clock signal, providing a high speed, cost effective interface to a direct access storage device.

3 Claims, 6 Drawing Sheets

SELF-TIMED PARALLEL DATA BUS INTERFACE TO DIRECT STORAGE DEVICES

CROSS REFERENCE TO RELATED APPLICATIONS

The present United States patent application is related to the following United States patent applications incorporated herein by reference:

Application Ser. No. 08/261,515, filed Jun. 17, 1994, entitled "Self-Timed Interface," and assigned to the assignee of this application.

Application Ser. No. 08/261,522, filed Jun. 17, 1994, entitled "Multiple Processor Link," and assigned to the assignee of this application.

Application Ser. No. 08/261,561, filed Jun. 17, 1994, entitled "Enhanced Input-Output Element," and assigned to the assignee of this application.

Application Ser. No. 08/261,603, filed Jun. 17, 1994, entitled "Massively Parallel System," and assigned to the assignee of this application.

Application Ser. No. 08/261,641, filed Jun. 17, 1994, entitled "Shared Channel Subsystem," and assigned to the assignee of this application.

DESCRIPTION

BACKGROUND OF THE INVENTION

1. Field of the Invention

This invention relates to an improved method and apparatus for transmitting digital data at high speeds via a parallel data bus, and more particularly, to a method and apparatus that provides a cost effective interface to a direct access storage device.

2. Description of the Prior Art

As will be appreciated by those skilled in the art, such factors as noise and loading limit the useful length of parallel busses operating at high data rates. In the prior art, the length of the bus must be taken into account in the system design and the bus length must be precisely as specified. Manufacturing tolerances associated with physical communication link (chips, cables, cord wiring, connectors, etc.) and temperature and variations in power supply voltage also limit the data rates on prior art busses comprised of parallel conductors. Further, many prior art computer systems transfer data synchronously with respect to a processor clock, so that a change in processor clock rate may require a redesign of the data transfer bus.

In a current large computer system, the I/O element can require more than 100 channel functions (as the middle stage/level in a hierarchically arranged busing network) between the highest level internal bus (fastest) and the more numerous and slower I/O controllers. In many system configurations, it is typical for up to 80% of the channels to be used for data transmission paths to the direct access storage device (DASD) data base via DASD I/O controllers. These numerous channels/paths can be required for connectivity to the data base, performance (access rate to the data base) or both.

In prior art systems, the channel's function is to execute, cooperatively with the attached I/O controller, channel programs (lists of channel/controller commands) which have been set up by application or operating system programs in host storage. Typical commands are to initiate the transfer of data between storage and the DASD attached to the I/O controller. Current channel functions are thus designed to transmit this data at a maximum rate (e.g., 18 MB/S) consistent with current DASD I/O controller capabilities.

SUMMARY OF THE INVENTION

An object of this invention is the provision of a cost effective bus data transfer system that can operate at high data transfer rates without tight control of the bus length, and without system clock constraints; a system in which the maximum bus length is limited only by the attenuation loss in the bus.

Another object of the invention is the provision of a general purpose, low cost, high performance, point to point data communication link where the width and speed of the interface can easily be modified to tailor it to specific bandwidth requirements and to specific implementation technologies, including VLSI technologies.

A further object of the invention is the provision of a bus data transfer system that operates a clock rate equal to the data rate.

A more specific object of the invention is the provision of a system that adjusts the phase or arrival time of the incoming data on the receive side so it can be optimally sampled by the local receive clock, compensating for many of the manufacturing tolerances associated with the physical link (chip, cable, card wiring, connectors, etc.) as well as temperature changes and power supply output variations.

Yet another object of the invention is to provide improved, cost-efficient attachment of direct access storage devices (DASD).

DASD I/O controllers can be based on redundant arrays of independent disks (RAID) technology. This significantly increases storage capacity per I/O controller, exceeding the access rate a single channel can support. Many channels are therefore needed per I/O controller. In lieu of using multiple (e.g., 10, 20) channels per I/O controller to match the increased I/O (DASD) controller capability, and still another object of this invention is to reduce the number of links required. A still further object of the invention is to enable channel commands, instead of being forwarded from system port to I/O sub-element channel function and then executed cooperatively by channel function and I/O (DASD) controller, to be forwarded through the I/O sub-element directly to the system DASD I/O controller for execution. Data associated with the commands is routed in the same manner.

Elimination of channel hardware reduces both total system size and cost providing a more effective means for the attachment of local DASD to computer systems.

Briefly, this invention contemplates the provision of a self-timed interface (STI) in which a clock signal clocks bit serial data onto a parallel, electrically conductive bus and the clock signal is transmitted on a separate line of the bus. The received data on each line of the bus is individually phase aligned with the clock signal. The received clock signal is used to define boundary edges of a data bit cell. It is defined individually for each line and the data on each line is individually phase adjusted so that, for example, a data transition position is in the center of the defined cell. The data is read into a buffer where it is decoded and read out synchronously with the receiver system clock. At the data rates contemplated in the application of this invention, the propagation delay is significant. However, within limits, the bus length is not critical and is independent of the transmit and received system clock. The phase adjustment can compensate for a skew of up to one bit cell across the width of the bus.

In one specified embodiment of the invention, data to be transmitted is transferred to a buffer synchronously with the transmitter system clock, which may or may not be the receiver system clock. A controller formats the data into packets for byte parallel, bit serial, transmission along with headers specifically coded to provide unique data patterns that allow for correction of skew of up to three bit cells in addition to the initial phase adjustment.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
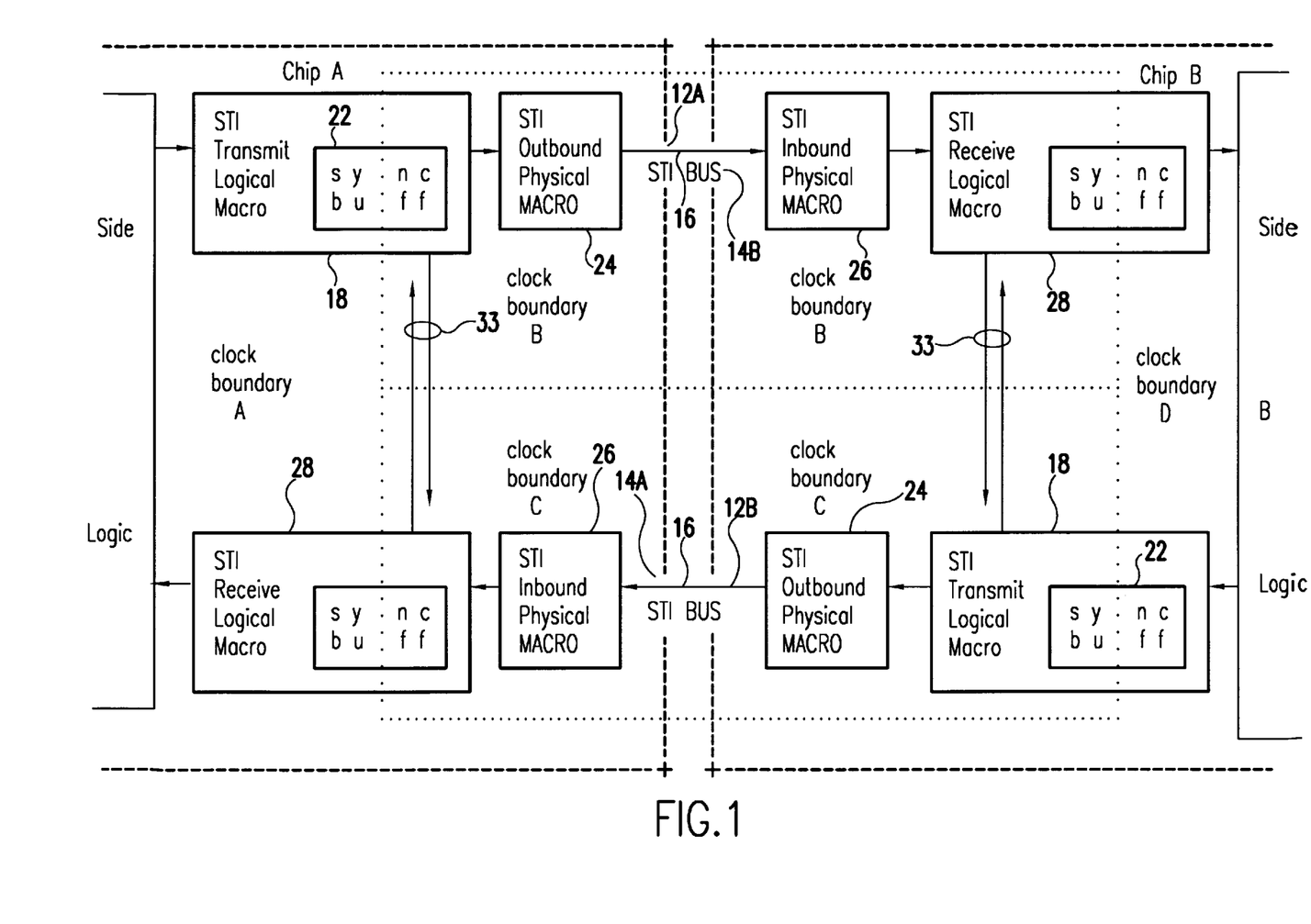
FIG. 1 is an overview block diagram illustrating the application of a self-timed interface, in accordance with the teachings of this invention, for data communication among computer chips.

Referring now to FIG. 1 of the drawings, it illustrates one embodiment in which a self-timed interface in accordance with the teachings of this invention can be used. This exemplary embodiment of the self-timed interface provides data communications between two microprocessor chips, labeled here as Chip A and Chip B. However, as will be apparent to those skilled in the art, the self-timed interface of this invention is applicable to provide data transfer between a wide variety of components or nodes.

Chip A has a transmit port labeled 12A and Chip B has a transmit port labeled 12B. Similarly, Chips A and B have receive ports labeled 14A and 14B, respectively. The ports are connected by two self-timed interface busses 16; one for each transmission direction. In this exemplary embodiment of the invention, each bus 16 is one byte wide, and comprised of ten electrical conductors; nine conductors for data and one conductor for a clock signal.

Each transmit port (12A and 12B) includes a transmit logical macro 18 that provides a logical interface between the host logic and the self-timed interface link 16. Sync buffers 22 provide an interface between the host clock and the self-timed interface clock. This allows the self-timed interface link to run at a predetermined cycle time that is independent of the host clock, making the self-timed interface link independent of the host. An outbound physical macro 24 serializes a word-wide data flow into a byte-wide data flow that is transmitted along with the clock on the self-timed interface link 16.

Each receive port (i.e., 14A and 14B) includes an inbound physical macro 26 that first dynamically aligns each data bit with the self-timed interface clock signal. It aligns any bits with skew up to three bit cells and deserializes the bytes into words. A receive logical macro 28 provides an interface between the self-timed interface receiver logic and the host logic and generates link acknowledge signals and link reject signals, which are coupled by internal links 33 and transmitted back to the transmitting port via an outbound self-timed interface link 16. In order to compensate for variations in electrical path delay, the phase of the incoming data is adjusted, or self-timed. Each bit (line) is individually phase aligned to the incoming reference clock and further aligned to compensate, within embodiment, for up to three bit cells of skew between any two data lines. The self-timing operation has three parts. The first is to acquire bit synchronization; the second is byte/word alignment; and the third is maintaining synchronization.

In acquiring bit synchronization, the link takes itself from a completely untimed state into synchronous operation. Any previous condition on the STI interface or logic is disregarded with a complete logic reset. The bit synchronization process can be rapidly established, for example on the order of 200 microseconds. The phase of the incoming data is manipulated on a per line basis until the data valid window or bit interval is located. This is accomplished using a phase detector that locates an average edge position on the incoming data relative to the local clock. Using two phase detectors one can locate two consecutive edges on data and these two consecutive edges define the bit interval or data valid window. The data to be sampled by the local clock is the phase of the data located halfway between the two edges of the data.

Byte alignment takes place by manipulating the serial data stream in whole bit times to properly adjust the byte position relative to a deserializer output. Word alignment takes place next by manipulating the deserializer data four bit intervals a time to ensure proper word synchronization on the STI interface. A timing sequence allows proper bit, byte and word synchronization.

Synchronization maintenance occurs as part of the link operation in response to temperature and power supply variations.

Figure 2:
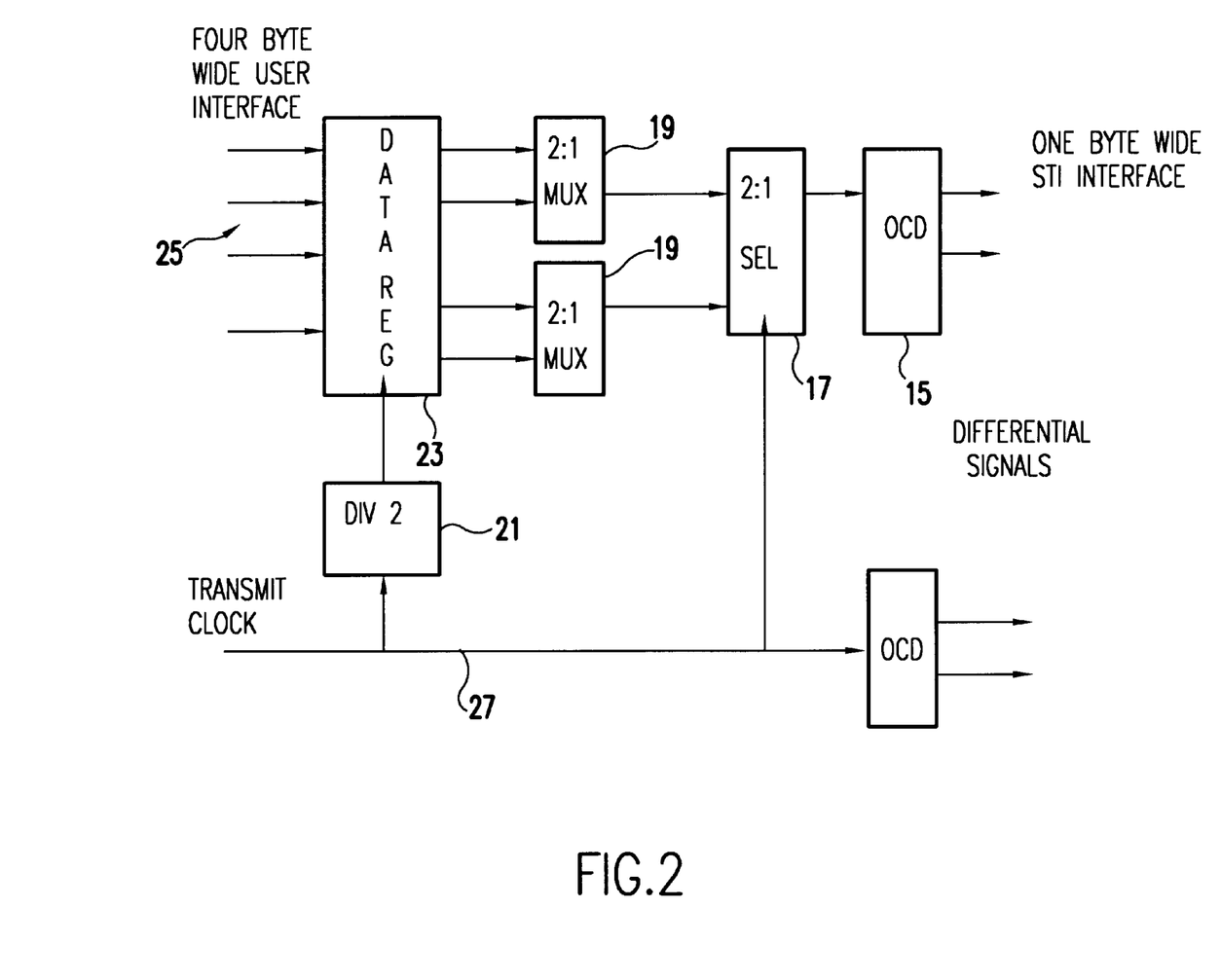
FIG. 2 is a block diagram illustrating one embodiment of a transmitter serializer for implementing a self-timed interface in accordance with this invention.

Referring now to FIG. 2, which illustrates one embodiment of a transmit serializer for a bit serial byte parallel interface used in the practice of the invention. Here a four byte wide data register 23 receives parallel inputs 25 (bytes 0, 1, 2 and 3 inputs shown here) and multiplexes them to a one byte wide self-timed interface. Data is clocked from the register 23 by a divide by two of the self-timed interface clock on line 27. Bit zero from bytes 0, 1, 2 and 3 are serialized and transmitted on link 0 of the self-timed interface, shown here. Bit 1 from bytes 0, 1, 2 and 3 will be transmitted on link 1 (not shown) and so on.

To minimize the bandwidth requirements of the communication media the STI clock is one half the frequency of the transmitted data (baud) rate, i.e., a 75 Mhz clock will be used for a 150 Mbit/S data rate. The clock will be generated from an STI oscillator source, this is done to decouple the system or host clock from the STI link. The data will be transmitted with both edges of the clock.

Figure 3:
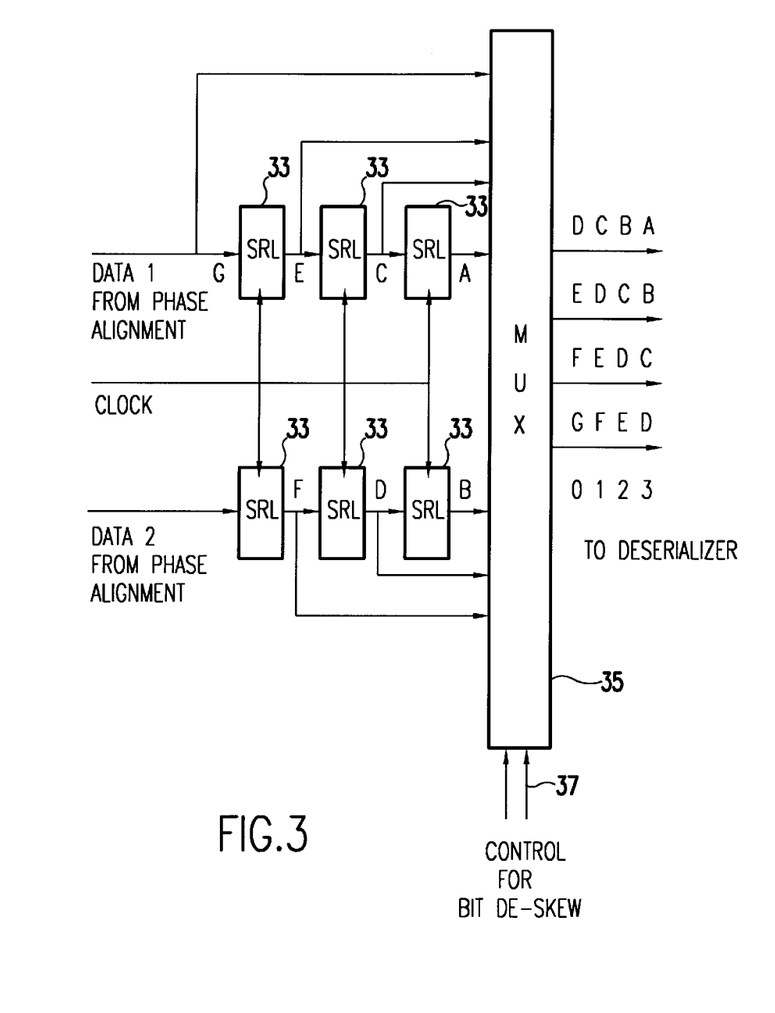
FIG. 3 is a block diagram illustrating byte synchronization in accordance with the invention.

Referring now to FIG. 3, assuming a bit synchronization process as described in copending Application Ser. No. (attorney Docket No. PO9-93-054), byte synchronization starts by coupling the phase aligned data (now 2 bits wide) into a shift register 33 whose outputs are coupled to multiplexer 35. The control inputs to the multiplexer will be used to deskew the particular data line from the other data lines by whole bit times. The deserializer data output for a particular data line is monitored for the expected timing pattern (X 0 1 0 where X is a don't care) to determine the proper order of the received data. If at any time a zero is detected in the bit 3 position the multiplexer is incremented thus moving the byte boundary by one bit time. This process is repeated until the proper byte boundary is located. The multiplexer control wraps around from a binary 3 to a binary 0 in case the correct position was incorrectly passed through the previous time. this function allows synchronization of data lines skewed by more than an entire bit time.

Figure 4:
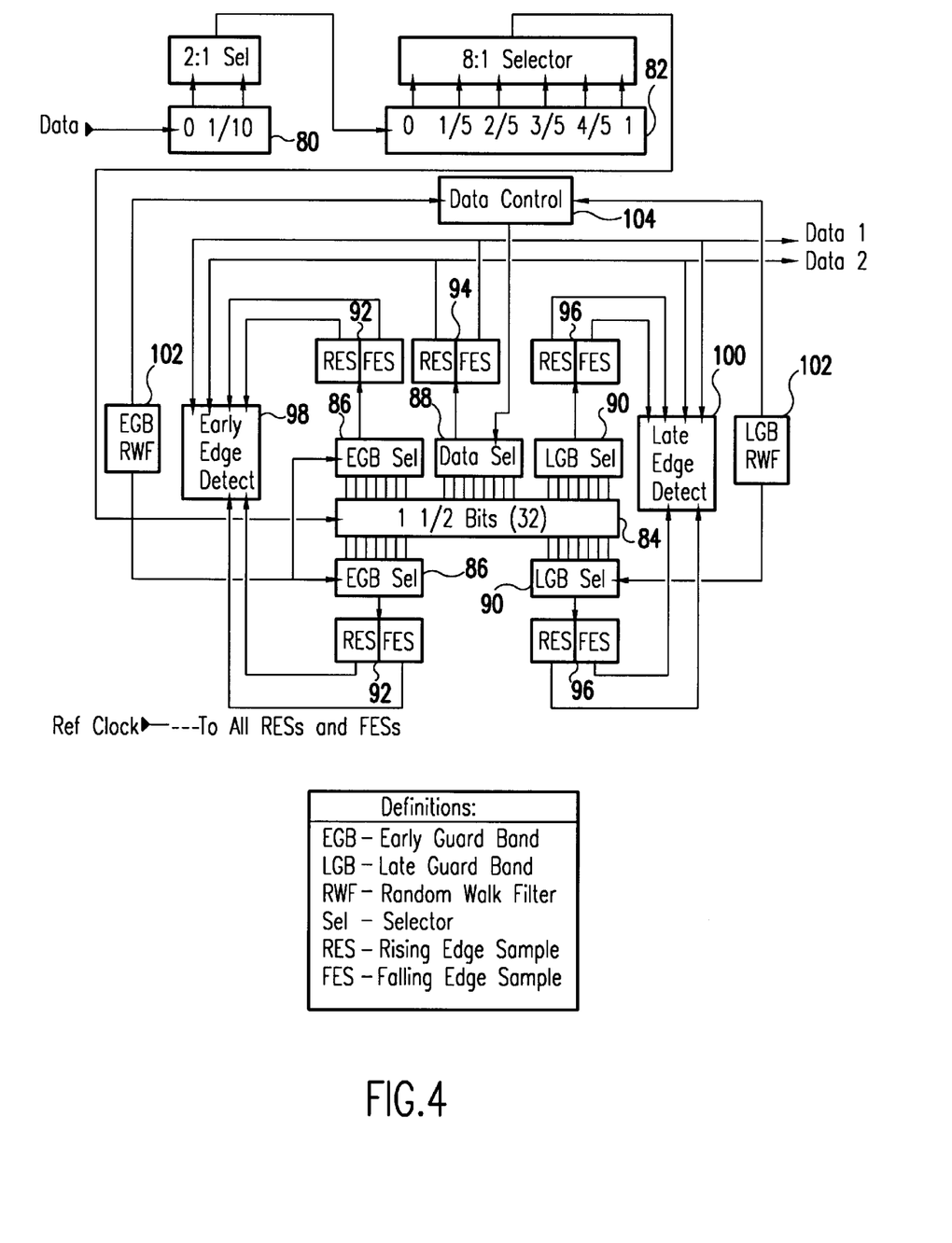
FIG. 4 illustrates phase alignment and sampling logic in accordance with a preferred embodiment of the invention.

Referring now to FIG. 4, in this embodiment of the invention, the clock rate is the same as the data rate. The data edges that define a data window are each detected independently of the other and the data is sampled at the midpoint between the edges when the edges have been aligned with the clock. The position of the edges of incrementally separated phases of the input data stream are successively compared to the position of the rising and falling edges of the clock in order to locate the edges of the data stream with respect to both edges of the clock (e.g., the rising and falling edges).

The data phase pairs are generated in this specific embodiment of the invention by three incrementally selectable delay elements 80, 82, and 84. For example, the elements 80 and 82 provide delays, respectively, in 1/10th and 1/5th bit time increments and element 84 provides fine increments on the order of 1/20th of a bit time. The fine delay element 84 is separated into three groups to provide early edge detection, system data detection, and late edge detection. An early guard band selector 86 successively selects one phase of the data stream to provide an "early" phase of the incrementally separated phases—one for the rising edge and one for the falling edge. Similarly, a late guard band selector 90 successively selects one phase of the data stream to provide a "late" phase of the incremental phases—again one for the rising edge and one for the falling edge. A selector 88 selects incremental phases for the mid-cell system data position.

A selected data phase is coupled as an input to master-slave RES-FES latch pairs 92, 94, and 96. The rising edge data samples are clocked into the RES latches and the falling edge data samples are clocked into the FES latches. The outputs of the RES-FES latch pair 92 are connected to an early edge detector 98. Similarly, the outputs of the RES-FES latch pair 96 are coupled to a late edge detector 100. The RES latch of pair 94 is coupled to the early edge detector 98 and the FES latch of pair 94 is coupled to the late edge detector 100.

Each edge detector (98 and 100) outputs a "lead", a "lag" or a "do nothing" output which indicates the location of a data edge with respect to the reference clock edge location. The output of each edge detector is coupled via a suitable filter 102 (i.e., a random walk filter), back to its respective selector 86 and selector 90, respectively. The selectors shift the phase of the data coupled to the RES-FES latches in the direction indicated, or if "do nothing" is indicated, the phase of the data at that edge is not shifted.

Data control logic 104 controls the system data output by selecting the phase of the data that is halfway between the two data edges when the data edges are aligned with the reference clock. A phase of the data (Data 1 and Data 2) is outputted at each reference clock edge.

In operation of a specific embodiment, at power on the logic will automatically begin the bit synchronization process. A 16 microsecond (final value TBD) timer is started, the bulk delays are reset to their minimum delay and a 16 bit counter running off the divided down clock is started. The edge detect circuitry will sample the incoming data with the received reference clock. The edge detector will output a "lead", a "lag" or a "do nothing" signal that indicates the data edge location relative to the reference clock. This signal is filtered by a Random Walk Filter (RWF) and fed-back to the selectors of their respective RES and FES circuits. The selectors shift the phase of the data into the RES and FES as indicated by the edge detector. Each edge detector operates independently of the other. Each will locate the transitions on data relative to the received (ref) clock by manipulating the incoming phase of the data into the edge detector as described above. The phase of the system data is controlled by the data control logic which selects the phase of the data halfway between the two edge detectors. In parallel with the bit synchronization process, the order of bits out of the deserializer are manipulated to the correct order (see byte/word synchronization below). When the 16 microsecond timer trips the algorithm resets a deserializer error latch and restarts the 16 microsecond counter. The deserializer output is compared against the expected timing pattern (X 0 1 0 where X is a don't care). A single miscompare on any cycle during the next 16 microseconds will set the deserializer error latch. When the 16 microsecond counter trips again the algorithm checks the addresses of the EGB, LGB, and data selectors, deserializer error latch. In order for a bit to end the initial bit synchronization search state, the deserializer output latch must have remained reset AND the all selectors must be properly centered in their tracking range (centering ensures that adjustments can be made to allow for the tracking of temp. and power supply variations after the initial bit synchronization process). If both conditions are not met then the algorithm adds a bulk delay element, resets the 16 microsecond counter and the search process begins once again. Each and every bit (data line) on the STI interface undergoes this process in parallel. Once an individual data line is determined to meet the initial bit synchronization criteria described above it is degated while the other lines continue to be adjusted. The bit synchronization process is complete once all bits are adjusted and meet the search criteria. The logic will not exit the bit synchronization mode until the 16 bit counter trips.

Finally word alignment takes place. Word alignment is established by manipulating the deserializer output bus four bits at a time until word synchronization is established. Note that the first register is shifted by four bit times relative to the second register. Four bit times is the maximum any data bit can be skewed relative to another data bit (3 bit times on link+1 bit time from phase alignment section).

During normal operation the physical macro will continuously monitor the incoming data to ensure that the optimum clock sampling relationship exists. Small updates will be made to track temperature, power supply and data jitter. These updates will be seamless and transparent to the host logic. Approximately ½ a bit time of delay will be needed to compensate for temperature and power supply variations to maintain proper synchronization. This added delay is in the fine delay elements section. There is also circuitry to monitor the position of the guard bands relative to the allowable range of operation. If a guard band reaches the end of its range, two cases exists: 1) a new bulk delay element is added and the fine delay elements are adjusted accordingly. Note this can cause sampling errors in the data. The circuitry that makes these on the fly bulk adjustments can be inhibited so no on the fly bulk delay adjustments are made during normal operation. The second case exists when one of the guard bands reaches the end of its range and the on the fly bulk delay adjustment is inhibited, the physical macro will signal the logical STI macro that a bit synchronization is required soon. The link should finish the immediate work and force the link into timing mode.

Figure 5:
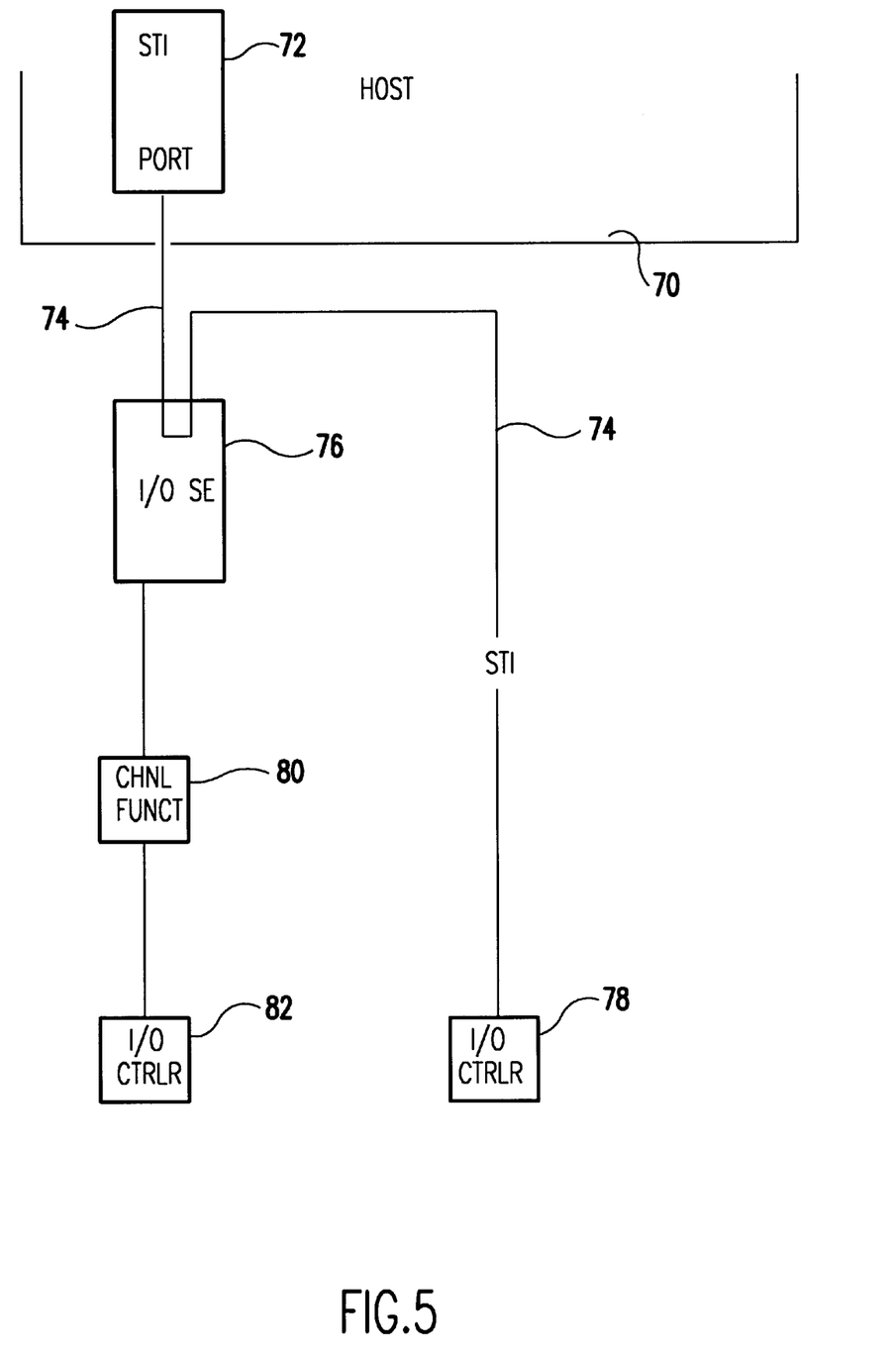
FIG. 5 is a block diagram of a direct access storage link in accordance with the teachings of this invention.

Referring now to FIG. 5, a host processor 70 has a self-timed interface port 72 coupled by a self-timed interface link 74 to an input-output sub-element 76. The sub-element 76, in one state, couples the port 72 directly to a disk controller (DASD) 78. In this state, the STI link 74 enables channel commands to be forwarded directly through the input-output sub-element 76 directly to the controller 78 for execution, instead of being forwarded from a system port to an input-output sub-element channel function 80 and then executed cooperatively by the channel function and the input-output controller 82. Data associated with the input-output commands is routed directly between the port 72, sub-element 76 and controller 78 via the STI link 74 in the same manner.

As an extension, a DASD could be connected through a switch containing multiple STI inbound and outbound STI ports. The host could selectively access multiple I/O elements and or multiple DASD or a combination of the two. Through a simple switching structure the host has a significantly large number of attachments, and flexibility. In this same arrangement, the host acting simply as a data manager, could direct stored information directly from DASD out to a particular channel, without the data passing through the host.

Figure 6:
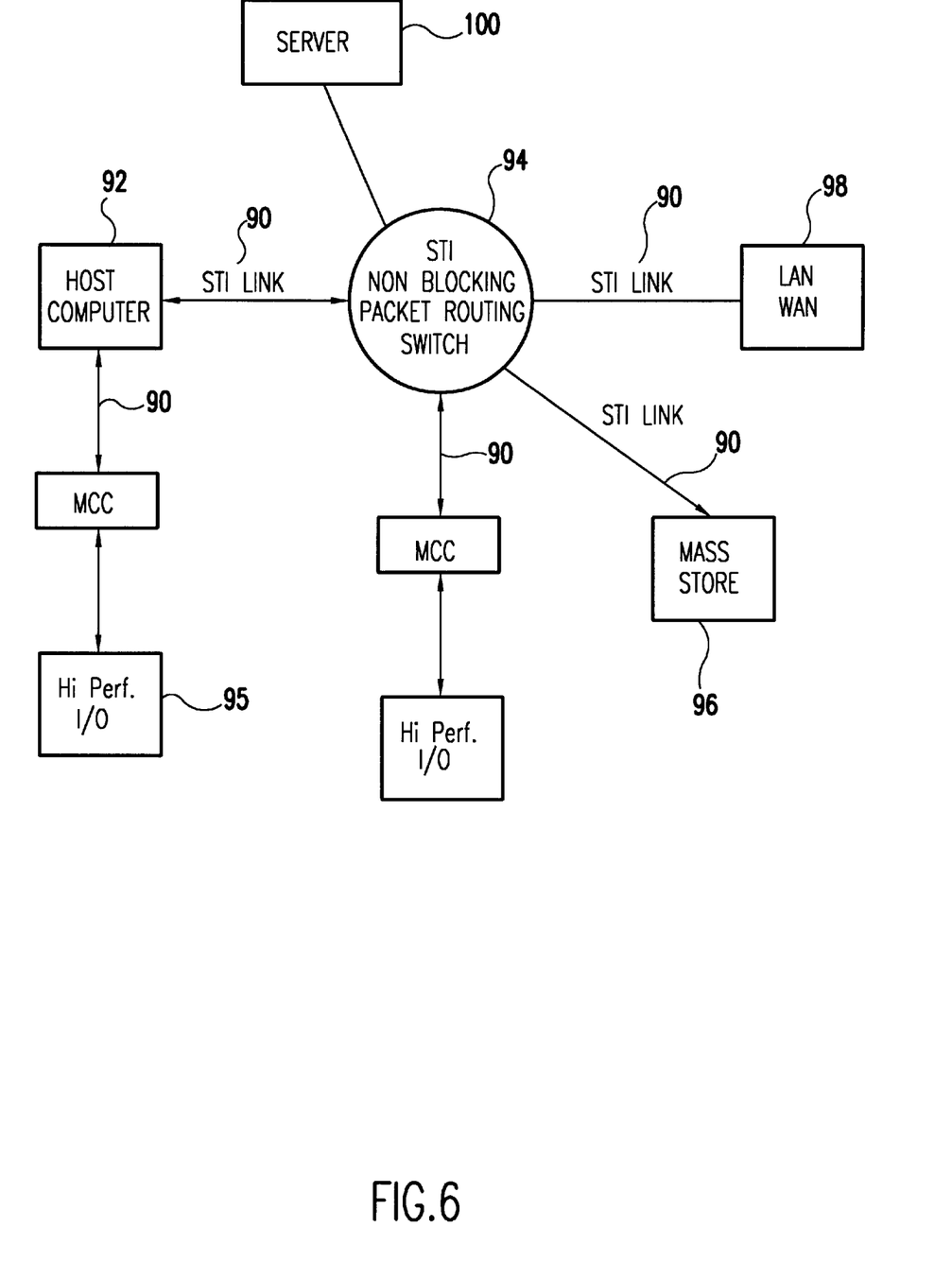
FIG. 6 is a pictorial diagram of a heterogeneous system employing self timed interfaces and self timed interface switches to interconnect industry standard input/output elements.

Referring now to FIG. 6, STI links can be used to construct a heterogeneous system environment. As shown, STI links 90 interconnect a host computer 92 directly with high-performance I/O 95 and through an STI switch 94, to a mass storage device 96, such as a CD ROM, to industry standard local area networks (LANs) and wide area networks (WANs) 98 and to servers 100.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A data processing system comprising in combination:
   a host processor;
   a peripheral controller;
   an input-output sub-element physically located remotely from said host processor;
   a self-timed interface link coupling host commands and data directly between said host processor to said input-output sub-element and said peripheral controller;
   said self-timed interface link including a transmitting node for transmitting a digital data and a clock signal and a receiving node for receiving said digital data and said clock signal, said transmitting node connected to said receiving node by a parallel data bus to individual lines of which respective bits of digital data streams are coupled in parallel by said clock signal at said transmitting node; and
   said bus including a separate line for transmitting said clock signal to said receiving node, and said receiving node including means to phase align said respective bits on each of said lines separately with respect to said clock signal transmitted to said receiving node.

2. A data processing system comprising in combination:
   a host processor;
   a non-blocking self-timed interface packet switch;
   a communications network;
   a mass storage unit;
   a peripheral controller;
   an input-output sub-element physically located remotely from said host processor;
   a self-timed interface link coupling host commands and data directly between said host processor to said input-output sub-element and said peripheral controller;
   a self-timed interface link coupling said mass storage unit to said self-timed interface non-blocking packet switch;
   a self-timed interface link coupling said communications network to said self-timed interface non-blocking packet switch;
   a self-timed interface link coupling said self-timed interface non-blocking packet switch to said host;
   said self-timed interface link including a transmitting node for transmitting a digital data and a clock signal and a receiving node for receiving said digital data and said clock signal, said transmitting node connected to said receiving node by a parallel data bus to individual lines of which respective bits of digital data streams are coupled in parallel by said clock signal at said transmitting node; and
   said bus including a separate line for transmitting said clock signal to said receiving node, and said receiving node including means to phase align said respective bits on each of said lines separately with respect to said clock signal transmitted to said receiving node.

3. A data processing system comprising in combination:
   a host processor;
   a non-blocking self-timed interface packet switch;
   a communications network;
   a mass storage unit;
   a server;
   a peripheral controller;
   an input-output sub-element physically located remotely from said host processor;
   a self-timed interface link coupling host commands and data directly between said host processor to said input-output sub-element and said peripheral controller;
   a self-timed interface link coupling said mass storage unit to said self-timed interface non-blocking packet switch;
   a self-timed interface link coupling said communications network to said self-timed interface non-blocking packet switch;
   a self-timed interface link coupling said self-timed interface non-blocking packet switch to said host;
   said self-timed interface link including a transmitting node for transmitting a digital data and a clock signal and a receiving node for receiving said digital data and said clock signal, said transmitting node connected to said receiving node by a parallel data bus to individual lines of which respective bits of digital data streams are coupled in parallel by said clock signal at said transmitting node;
   said bus including a separate line for transmitting said clock signal to said receiving node, and said receiving node including means to phase align said respective bits on each of said lines separately with respect to said clock signal transmitted to said receiving node; and
   a self-timed interface link coupling said server to said self-timed interface non-blocking packet switch.

* * * * *